United States Patent [19]
Rokutan

[11] Patent Number: 5,293,365
[45] Date of Patent: Mar. 8, 1994

[54] TRACK CONTROL CIRCUIT FOR OPTICAL CARD RECORDING/REPRODUCING APPARATUS

[75] Inventor: Takao Rokutan, Higashimurayama, Japan

[73] Assignee: Olympus Optical Co., Ltd., Tokyo, Japan

[21] Appl. No.: 90,985

[22] Filed: Jul. 12, 1993

Related U.S. Application Data
[63] Continuation of Ser. No. 704,338, May 23, 1991, abandoned.

[30] Foreign Application Priority Data
May 30, 1990 [JP] Japan ............................. 2-140214

[51] Int. Cl.⁵ ............................................. G11B 7/095
[52] U.S. Cl. ............................ 369/44.25; 369/44.28; 369/44.29; 369/44.36
[58] Field of Search ............... 369/44.11, 44.24, 44.25, 369/44.26, 44.28, 43, 44.29, 44.32, 44.33, 44.34, 44.35, 44.36, 48

[56] References Cited
U.S. PATENT DOCUMENTS
| | | | |
|---|---|---|---|
| 4,616,353 | 10/1986 | Kaneda et al. | 369/43 |
| 4,890,273 | 12/1989 | Takeuchi et al. | 369/44.36 |
| 5,023,860 | 6/1991 | Ueda | 369/44.24 |
| 5,048,002 | 9/1991 | Horie et al. | 369/44.36 |
| 5,109,367 | 4/1992 | Yoshikawa | 369/44.36 |
| 5,138,596 | 8/1992 | Yamada | 369/44.36 |
| 5,146,443 | 9/1992 | Iwase et al. | 369/44.36 |

FOREIGN PATENT DOCUMENTS
2-285523 11/1990 Japan.

*Primary Examiner*—W. R. Young
*Assistant Examiner*—Nabil Hindi
*Attorney, Agent, or Firm*—Frishauf, Holtz, Goodman & Woodward

[57] ABSTRACT

In a track control circuit for an optical car recording/reproducing apparatus, a light beam for optically recording or reproducing information is incident on a desired track of an optical card having a plurality of tracks through a focusing lens. A beam reflected by a desired track of the optical card is detected by a photosensor, and a track error signal is generated as a signal representing a deviation of the reflected beam. A track actuator moves the focusing lens in horizontal and vertical directions so as to position the focusing lens on the track of the optical card in accordance with a track error signal gain-controlled by a variable gain amplifier. The variable gain amplifier receives a control signal from a CPU so as to change the gain of the track error signal in accordance with the amplitude of the generated track error signal.

14 Claims, 8 Drawing Sheets

TRACK CONTROL CIRCUIT FOR OPTICAL CARD RECORDING/REPRODUCING APPARATUS

This application is a condition of application Ser. No. 07/704,338, filed May 23, 1991 now abandoned.

BACKGROUND OF THE INVENTION

1. Field of the Invention

The present invention relates to a track control circuit for an optical card recording/reproducing apparatus and, more particularly, to a track control circuit for an optical card recording/reproducing apparatus for controlling the amplitude of a track error signal from an optical card.

2. Description of the Related Art

A conventional optical information recording medium such as an optical card having a large volume of information has a plurality of tracks in its data recording area at predetermined intervals. In an optical card recording/reproducing apparatus serving as an information recording/reproducing apparatus, a desired track of the optical card is irradiated with a recording-/reproducing light beam. A focus servo system is controlled to obtain an in-focus point of the light beam on this track. At the same time, a track servo system is controlled so that the light beam is always located at the center of the track. A focus error signal representing a deviation from the in-focus point and a track error signal representing a positional error from the center of the track are required as signals for controlling the focus servo system and the track servo system.

The light beam is split into a main beam and sub-beams which interpose the main beam therebetween in accordance with a known 3-beam method. These three light beams are detected by a photosensor so that beams the reflected by the optical card are received and the reflected light amounts are detected. Of the detected beams, the main beam is used to obtain the focus error signal, and a difference between the remaining two sub-beams is used as the track error signal.

More specifically, the first and second detection signals representing the reflection light amounts of these two sub-beams are input to a subtracter. A difference between the first and second detection signals is calculated by the subtracter and is output as the track error signal.

The track servo system is arranged as follows. The difference between the first and second detection signals is calculated by the subtracter, and at the same time, a sum of the first and second detection signals is calculated by an adder. An output from the subtracter is divided by an output from the adder by a divider to obtain the track error signal. This divider is used to eliminate influences, on the track error signal, of contamination of the data recording area of the optical card, variations in reflectances of tracks caused by fingerprints of users, and changes in intensities of the light beams in the recording and reproduction modes.

The track error signal output from the divider is input to a track actuator through a switch opened/closed by controlling a track ON signal from a control unit and through a drive amplifier. Therefore, the light beam is adjusted to control tracks.

In general, reflectances of tracks formed in the data recording area of an optical card and guide tracks formed at both sides of the tracks along then considerably vary, and various combinations of reflectances are given. For example, in the track servo system having the arrangement described above, influences, on the track error signal, of contamination and fingerprints o the data recording area of the optical card can be eliminated.

When a difference between reflectances between a track and a track guide is changed, the amplitude of a track error signal is changed. For this reason, the gain of the track control system is changed to result in unstable track control. In such a conventional track servo system, when a difference between reflectances of a track and a guide track of an optical card is large, the light beam must be adjusted depending on the optical card used.

SUMMARY OF THE INVENTION

It is, therefore, an object of the present invention to provide a track control circuit for an optical card recording/reproducing apparatus, capable of performing stable track control without adjusting an optical beam depending on each optical card used when a difference between reflectances of a track and a guide track of the optical card is large.

According to an aspect of the present invention, there is provided a track control circuit for an optical card recording/reproducing apparatus, comprising light beam means for emitting a light beam for optically recording/reproducing information onto a card-like optical recording medium having a plurality of tracks, focusing lens means for focusing the light beam emitted from the light beam means onto a desired track of the card-like optical recording medium, photosensing means for detecting a beam reflected by the desired track of the card-like optical recording/reproducing medium, error signal generating means for generating a track error signal output in accordance with a deviation of the reflected beam detected by the photosensing means, gain control means for controlling a gain of the track error signal generated by the error signal generating means, determining means for determining whether the track error signal generated by the error signal generating means is normal, driving means for performing positioning with respect to a given track of the card-like optical recording medium in accordance with the track error signal controlled by the gain control means such that the light beam emitted from the light beam means is moved to a track different from the given track of the card-like optical recording medium when the track error signal is determined not to be normal by the determining means, and control means for generating a control signal to cause the gain control means to change the gain of the track error signal in accordance with an amplitude of the track error signal generated by the error signal generating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will be described with reference to the accompanying drawings.

Figure 1:
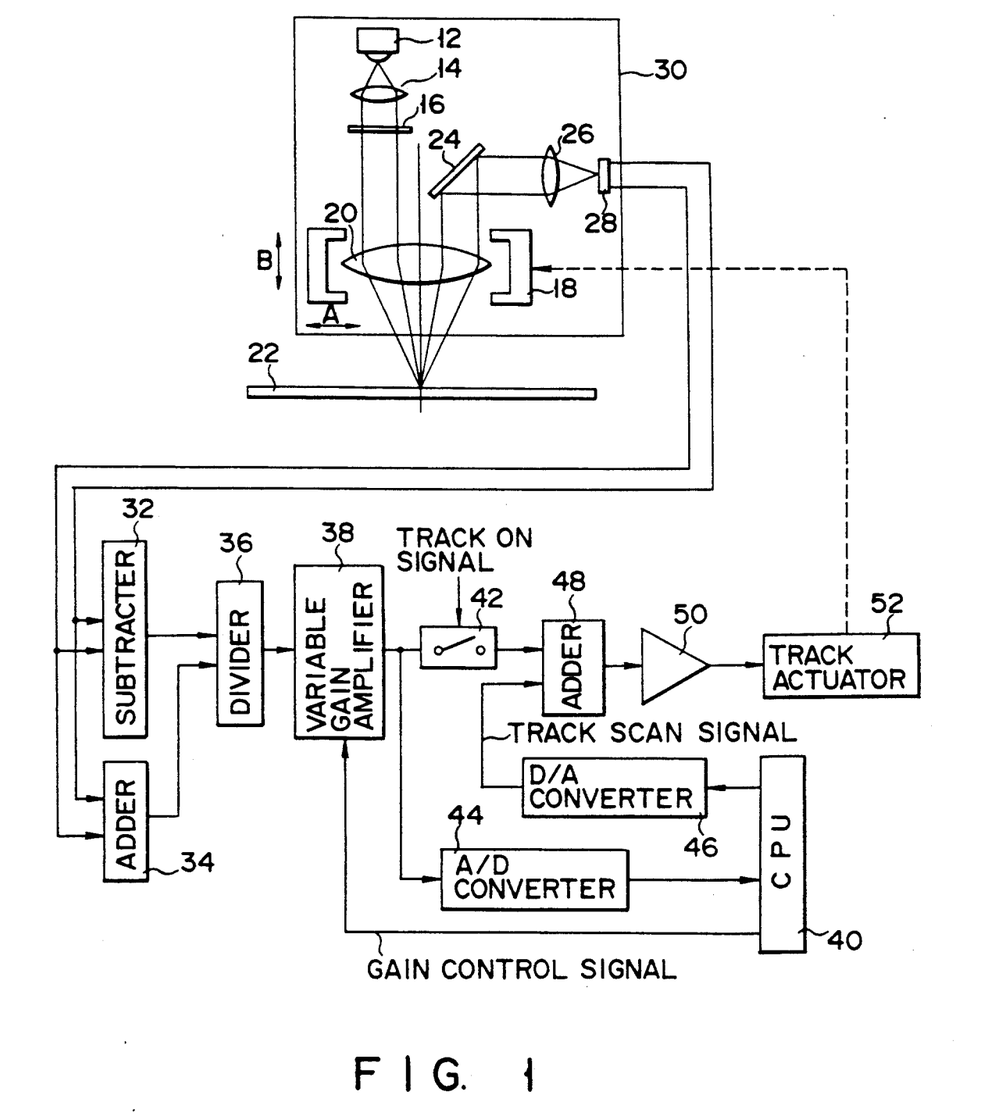
FIG. 1 is a schematic block diagram showing a track control circuit for an optical card recording/reproducing apparatus according to the present invention.

FIG. 1 is a schematic block diagram showing a track control circuit for an optical card recording/reproducing apparatus. Referring to FIG. 1, a light beam emitted from a semiconductor laser 12 serving as a light source is collimated by a collimator lens 14. The collimated beam is split by a diffraction grating 16 into three light beams consisting of a main beam and two sub-beams which interpose the main beam therebetween. These beams are focused on an optical card 22 by a focusing lens 20 supported on a lens drive unit 18 movable in directions of arrows A and B by an actuator 52 (to be described later).

A beam reflected by the optical card 22 is reflected by a reflecting mirror 24, and the reflected beam is incident on a photosensor (to be described in detail later) 28 through a detection system lens 26. The axis of the light beam incident on the optical card 22 and the axis of the reflected beam are shifted from the optical axis of the focusing lens 20, as shown in FIG. 1. Note that the semiconductor laser 12, the collimator lens 14, the diffraction grating 16, the lens drive unit 18, the focusing lens 20, the reflecting mirror 24, the detection system lens 26, and the photosensor 28 constitute an optical system 30 of the recording/reproducing apparatus.

When reflection light amounts of the two sub-beams are detected by the photosensor 28, the photosensor 28 outputs detection signals to a subtracter 32 and an adder 34. Outputs from the subtracter 32 and the adder 34 are supplied to a divider 36 so as to divide the output from the subtracter 32 by the output from the adder 34. An output from the divider 36 is supplied to a variable gain amplifier 38, and the variable gain amplifier 38 outputs a track error signal gain-controlled by a gain control signal output from a CPU 40.

The track error signal is supplied to a switch 42 turned on/off by a track ON signal supplied from a control unit (not shown) and to the CPU 40 through an A/D converter 44. An output from the switch 42 is output to an adder 48 together with an analog track scan signal output from the CPU 40 through a D/A converter 46. An output from the adder 48 is amplified by a drive amplifier 50, and the amplified signal is supplied to a track actuator 5 for driving the lens drive unit 18.

An operation of the first embodiment will be described with reference to FIGS. 2 through 8 and a flow chart in FIG. 9.

Figure 2:
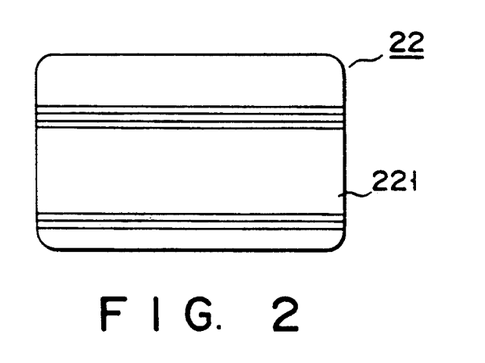
FIG. 2 is a plan view of an optical card shown in FIG. 1.
Figure 3:
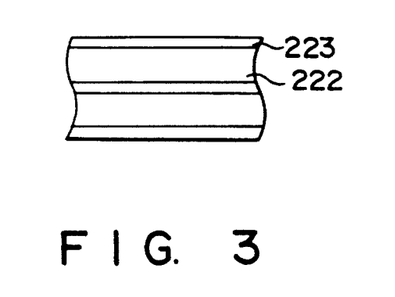
FIG. 3 is an enlarged view showing a data recording area of the optical card in FIG. 2.

FIG. 2 is a plan view of the optical card 22. Various types of information can be recorded in a data area 221. FIG. 3 is an enlarged view of the data recording area 221 shown in FIG. 2. Guide tracks 223 are formed on both sides of each of a plurality of tracks 222 in which information is recorded and extend along the tracks 222.

Figure 4:
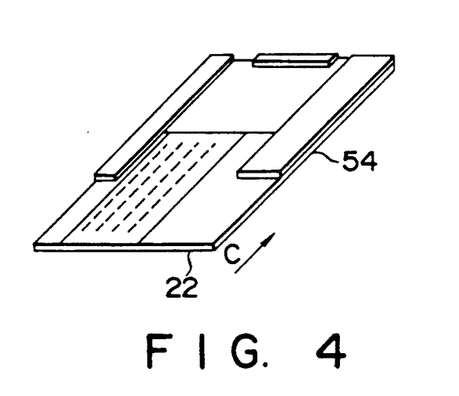
FIG. 4 is a view showing a state wherein the optical card is inserted into a card holder.

The optical card 22 having the structure described above is inserted into a recording/reproducing apparatus for recording or reproducing information (step A1). More specifically, as shown in FIG. 4, the optical card 22 is automatically or manually inserted into a card holder 54 for holding the optical card 22 in a direction indicated by an arrow C (FIG. 4).

Figure 5:
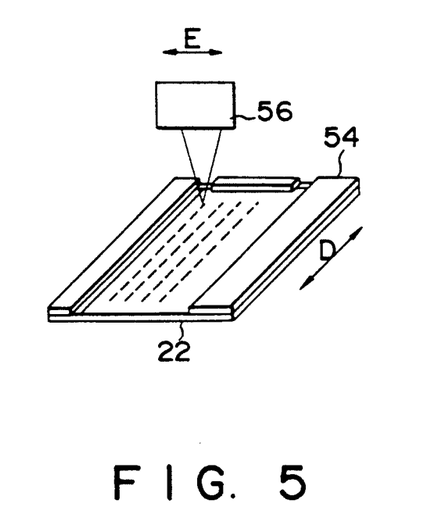
FIG. 5 is a view showing a state wherein the optical card is perfectly inserted into the card holder.

As shown in FIG. 5, when the optical card 22 is perfectly inserted into the card holder 54, the card holder 54 is moved by a drive unit (not shown) in a direction of an arrow D in FIG. 5. Focus search is performed by an optical head 56 including the optical system 30 and movable in a direction of an arrow E, so that the focus servo mode is set ON (step A2). This optical head 56 is located on the optical card 22 and is movable in the direction of the arrow E by the drive system (not shown). The optical head 56 is then accessed onto the target track of the optical card 22. When the position of the optical head 56 is determined, the card holder 54 is moved in the direction of the arrow D, and information is recorded or reproduced.

The light beam emitted from the optical head 56 (the optical system 30) to the optical card 22 is detected by the photosensor 28, as described above.

Figure 6:
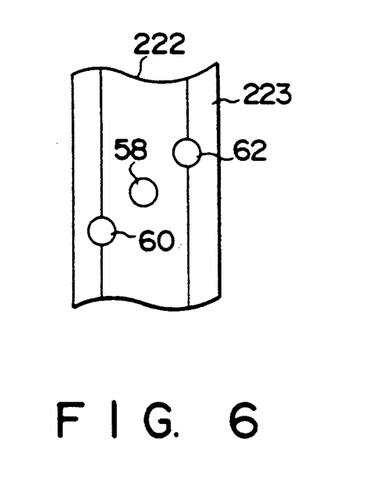
FIG. 6 is a view showing optical beams radiated on the optical card.

FIG. 6 shows optical beams incident on the optical card 22. The light beam emitted from the semiconductor laser 12 is split into a main beam 58 incident on the track 222 and sub-beams 60 and 62 sandwiching the main beam 58 and respectively incident on the track 222 and the guide tracks 223. Reflected beams of the main beam 58 and the sub-beams 60 and 62 are emitted from the optical card 22 to the photosensor 28.

Figure 7:
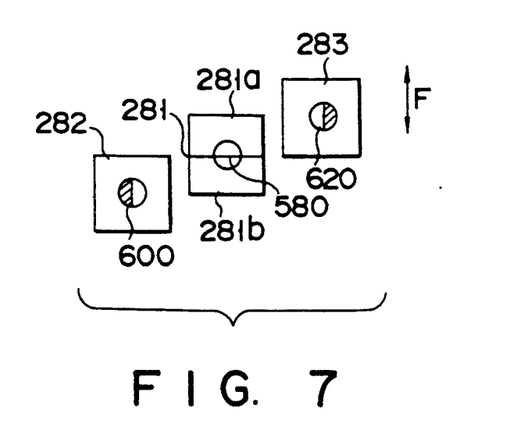
FIG. 7 is a view showing a photosensor (FIG. 1) consisting of sensors respectively corresponding to light beams.

The photosensor 28 has an arrangement shown in FIG. 7. The photosensor 28 is constituted by a main beam sensor 281 corresponding to the main beam 58 and sub-beam sensors 282 and 283 respectively corresponding to the sub-beams 60 and 62. Of these sensors, the main beam sensor 281 is further divided into sensor elements 281a and 281b. When a reflected beam 580 is located at the center between the two split sensor elements 281a and 281b, the reflected beam 580 is set in an in-focus point. When the reflected beam 580 is shifted in a direction of an arrow F, a distance between the focusing lens 20 and the optical card 22 is changed due to a shift in optical axis.

A focus error signal is obtained from a difference between outputs from the two sensor elements 281a and 281b of the main beam sensor 281. The sub-beam sensors 282 and 283 receive reflected beams 600 and 620 corresponding to the sub-beams 60 and 62 from the guide tracks 223 having a reflectance different from that of the track 222 and are used to detect a track error signal.

Figure 8:
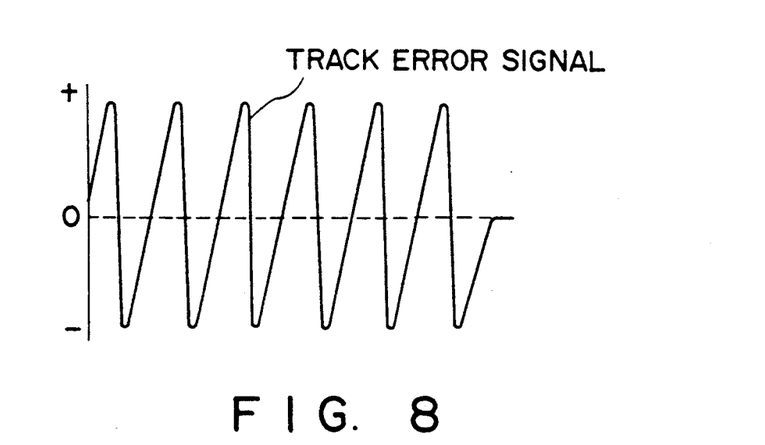
FIG. 8 is a waveform chart of a track error signal.
Figure 9:
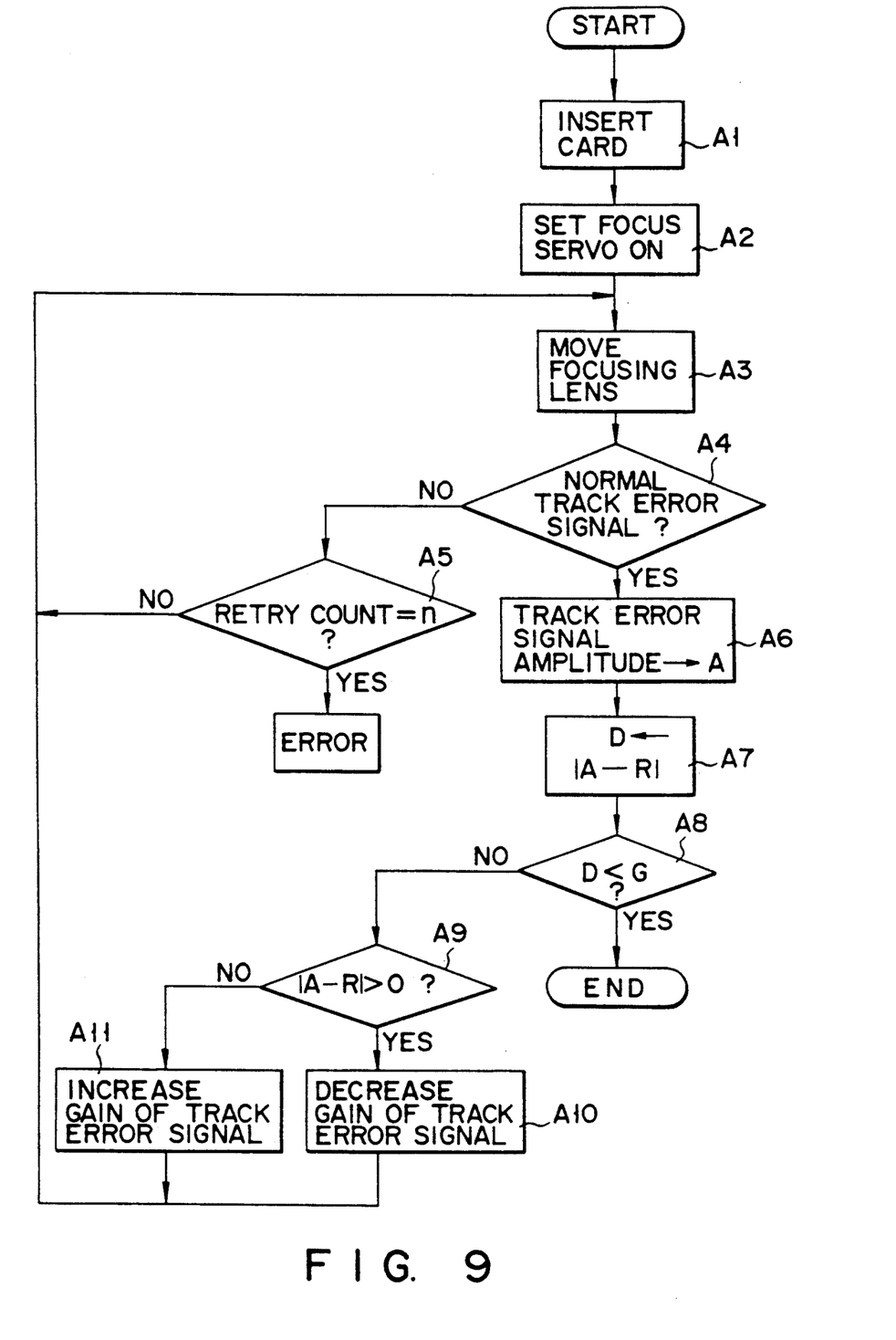
FIG. 9 is a flow chart for explaining the first embodiment of the present invention.

The track error signal is changed, as shown in FIG. 8. FIG. 8 shows a change in track error signal when an optical beam crosses a track.

Signals obtained by the photosensor 28 are supplied to the CPU 40 through the subtracter 32, the adder 34, the divider 36, and the like. At this time, the track scan signal from the CPU 40 is changed to drive the track actuator 52, thereby moving the lens drive unit 18 (step A3).

In step A3, the focusing lens 20 is moved in the direction of the arrow A upon movement of the lens drive unit 18. At the same time, the track error signal is fetched by the CPU 40 through the A/D converter 44. The CPU 40 determines whether the fetched track error signal is normal (step A4). This determination is performed because a normal track error signal may not be obtained due to defects such as dust and scratches on the optical card 22. When the amplitude of the track error signal during scanning falls outside the predetermined range, or when a predetermined number of peak values of the track error signal is not detected, the track error signal is determined as an abnormal track error signal.

When the track error signal is determined to be abnormal in step A4, it is then determined whether a retry count of track signal determination is a predetermined count, i.e., n (step A5). When the count reaches n, error processing is performed. Otherwise, the flow returns to step A3.

When the track error signal is determined to be normal in step A4, an amplitude A of the track error signal is obtained (step A6). An absolute value D of a difference between a target amplitude level R and the amplitude A of the track error signal obtained in the above step is calculated (step A7). It is then determined whether the absolute value D is smaller than a predetermined error G which is calculated in advance (step A8).

If condition $D<G$ is established, this track control processing is completed. However, when condition $D<G$ is not established in step A8, the flow advances to step A9 to compare the amplitude A of the track error signal with the target amplitude level R.

When the amplitude A of the track error signal is large than the predetermined target amplitude level R in step A9, a gain control signal is supplied from the CPU 40 to the variable gain amplifier 38 so as to reduce the gain in step A10. However, when the amplitude A of the track error signal is smaller than the target amplitude level R, a gain control signal is supplied from the CPU 40 to the variable gain amplifier 38 to reduce the gain in step A11. When the operation in step A10 or A11 is executed, the flow returns to step A3, and the above-mentioned processing is repeated.

FIGS. 10A through 10D show a track scan signal amplitude, a track error signal amplitude, a differential signal, and a binary signal of the differential signal, all of which correspond to an abnormal track error signal. FIGS. 11A through 11D show a track scan signal amplitude, a track error amplitude, a differential signal, and a binary signal of the differential signal, all of which correspond to a normal track error signal.

Figure 10A:
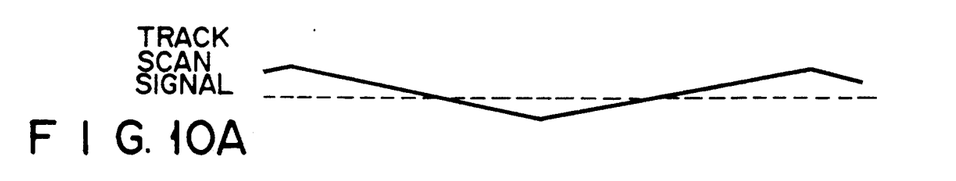
FIGS. 10A through 10D are waveform charts showing a track scan signal amplitude corresponding to an abnormal track error signal, a track error signal amplitude, a differential signal, and a binary signal of the differential signal, respectively.
Figure 10B:
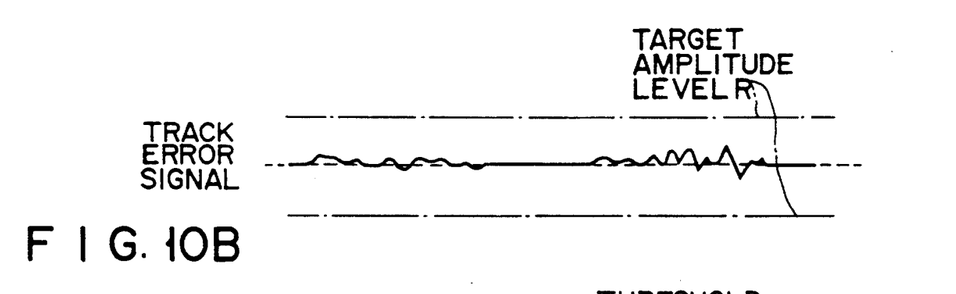

Referring to FIGS. 10A through 10D, a track scan signal shown in FIG. 10A is output from the CPU 40 through the D/A converter 46. As shown in FIG. 10B, a track error signal has an amplitude much smaller than the target amplitude level R. This indicates a case wherein the amplitude value of the track error signal during scanning falls outside the predetermined range, or the predetermined number of peak values of the track error signal cannot be detected.

Figure 10C:
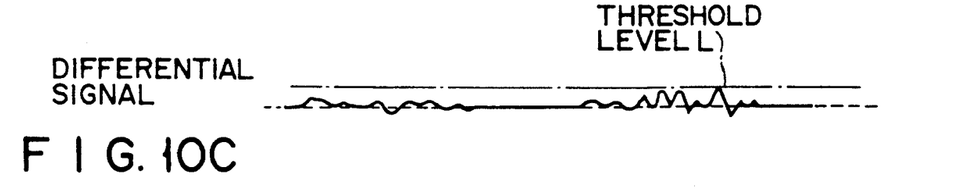
Figure 10D:
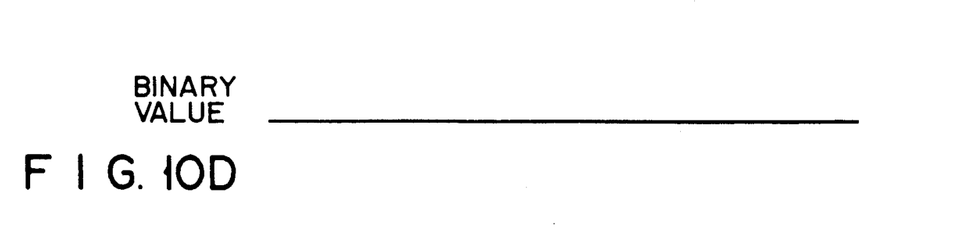

FIG. 10C shows a signal obtained by differentiating a track error signal having an amplitude much smaller than the target amplitude level R (FIG. 10B). The differential signal does not have a value exceeding a threshold level L. For this reason, even if the differential waveform is binarized, no signal is detected, as shown in FIG. 10D. Therefore, the track error signal is not detected. In this case, the track error signal is determined not to be normal in step A4, and the flow advances to step A5.

Figure 11A:
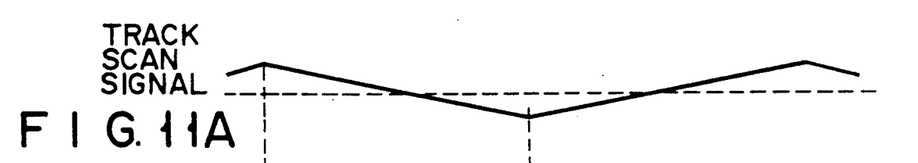
FIGS. 11A through 11D are waveform charts showing a track scan signal amplitude obtained when a track error signal is changed from an abnormal state to a normal state, a track error signal amplitude, a differential signal, and a binary signal of the differential signal, respectively.
Figure 11B:
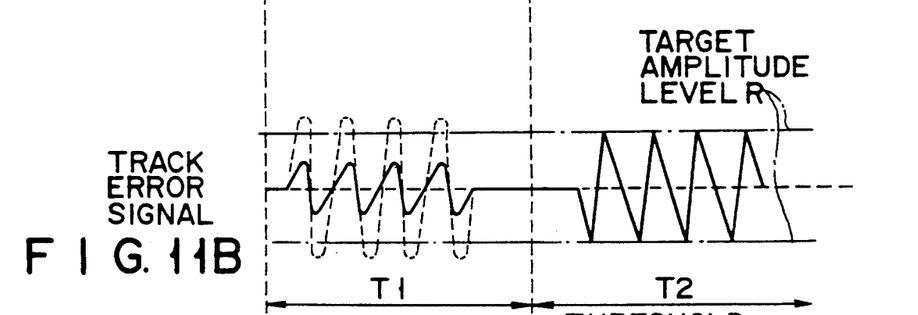

The amplitude A of the track error signal represented by a solid curve in FIG. 11B is smaller than the target amplitude level R with respect to the track scan signal shown in FIG. 11A (period T1). A gain control signal is supplied from the CPU 40 to the variable gain amplifier 38 to increase the gain. The amplitude level of the track error signal is increased to obtain a track error signal which satisfies almost the target amplitude level R (period T2).

Figure 11C:
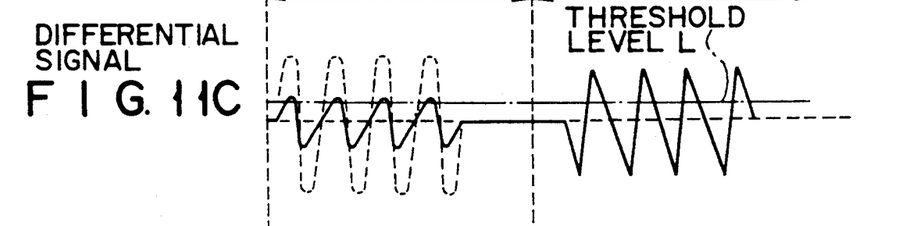
Figure 11D:
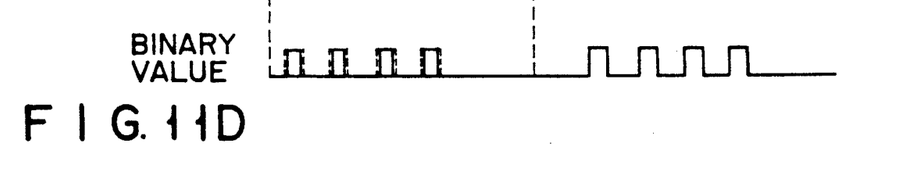

In this case, as shown in FIG. 11C, the amplitude of the signal obtained by differentiating the track error signal of FIG. 11B exceeds the threshold level L. For this reason, a portion exceeding the threshold level L is binarized. FIG. 11D shows the resulting binary signal. An operation for determining whether the track error signal is normal is performed such that binary values are counted and a normal track error signal is detected if a count of the binary values exceeds a predetermined value. Otherwise, the track error signal is determined to be abnormal.

The amplitude of the track error signal represented by a broken line in FIG. 11B is larger than the target amplitude level R. In this case, a gain control signal is supplied from the CPU 40 to the variable gain amplifier 38 to reduce the gain. The amplitude level of the track error signal is decreased, and a track error signal which satisfies almost the target amplitude level R is obtained.

As described above, by changing the amplitude level, a track error signal having a target amplitude level can be obtained. Thereafter, when track control loop is closed, an optimal control gain can be obtained. The track control gain can be controlled to be constant regardless of differences in reflectances of the tracks and guide tracks of the optical cards.

The above operations are performed while the optical card 22 and the optical head 56 are kept stopped. This stop position falls within the beam-irradiated data recording area 221 of the optical card 22 in which no data is recorded. This aims at preventing the following drawbacks: the focusing lens 20 is shifted in a wrong direction due to vibrations caused by a shift of the optical card 22 or the optical head 56; and a data portion adversely affects the track error signal upon scanning of the data recording area 221.

Since the track control position is fixed, when defects such as dust and scratches are present at this fixed position, an operation must be repeated to obtain a normal track error signal. In this case, if the defect is an important one, error processing must be performed as a result of repetitive operations.

The second embodiment improves the error processing and will be described with reference to flow charts in FIGS. 12 and 13. The constituting elements of this embodiment are the same as that of the first embodiment, and a detailed description of these elements will be omitted.

Figure 12:
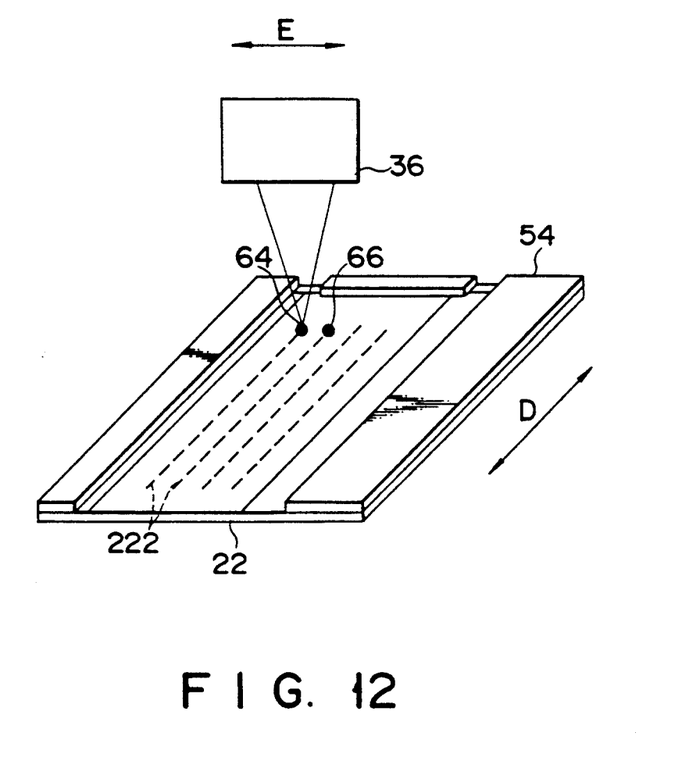
FIG. 12 is a view showing a state wherein an optical card is perfectly inserted into a card holder according to the second embodiment of the present invention.
Figure 13:
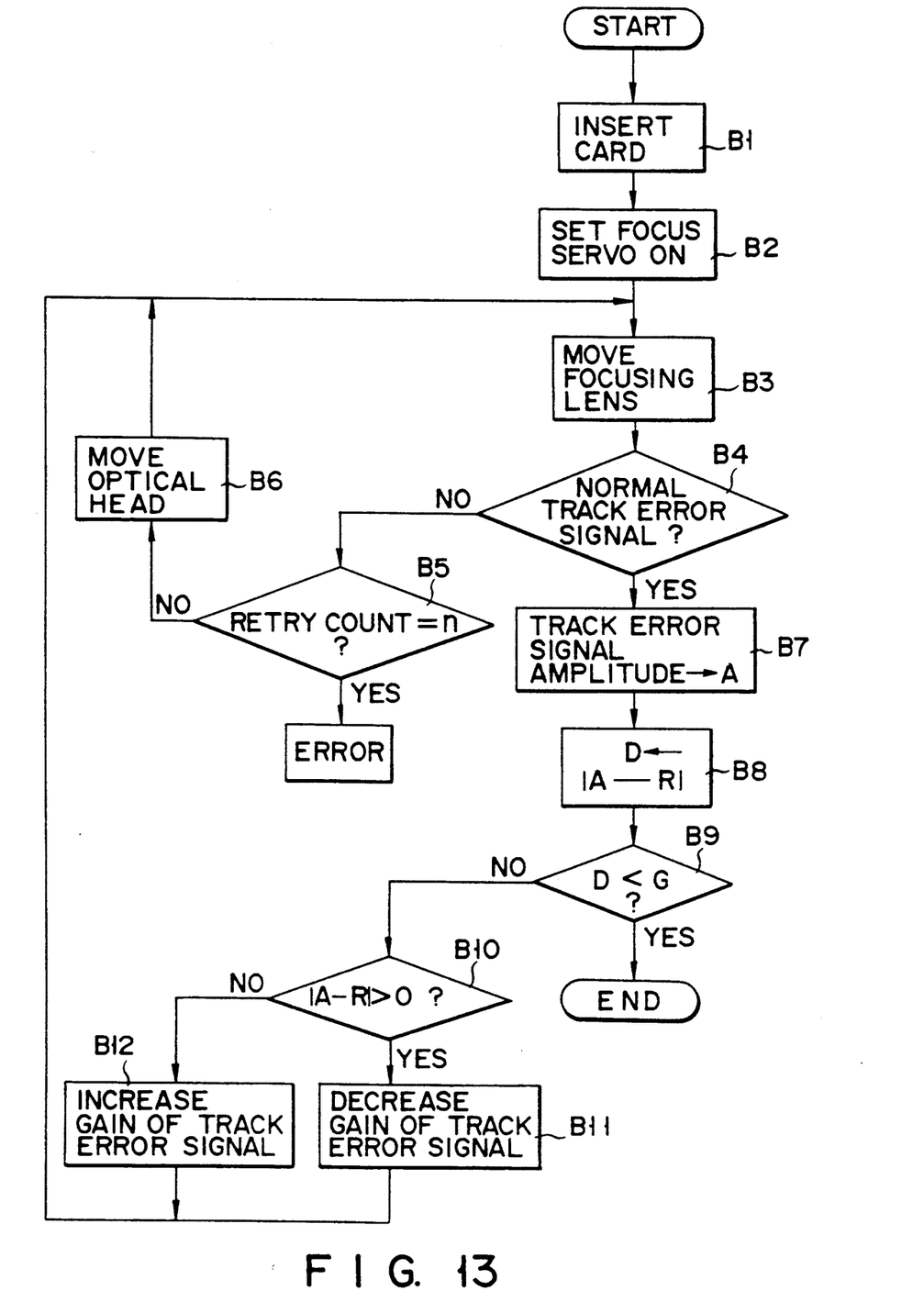
FIG. 13 is a flow chart for explaining the second embodiment of the present invention.

As shown in FIG. 12, when an optical card 22 is perfectly inserted into a card holder 54, the card holder 54 is moved by a drive unit (not shown) in a direction of an arrow D (step B1). Focus search is performed to enable focus servo by an optical head 56 including an optical system 30 and movable in a direction of an arrow E (step B2). Upon movement of a lens drive unit 18, a focusing lens 20 is moved (step B3). It is then determined whether a track error signal fetched by a CPU 40 is normal (step B4).

When an important defect 64 such as dust or a scratch is present on the optical card 22, a light beam emitted from the optical head 56 is not normally reflected by the optical card 22, and the track error signal is determined to be abnormal. For this reason, when the track error signal is determined in step B4 to be abnormal, the flow advances to step B5 to determine whether a retry count for track signal determination reaches a predetermined number, e.g., n.

When the above operation is repeated at the same position where the defect 64 present on the optical card 22 is considerably large, the operation must be repeated at the position of the defect. In this case, all track errors are determined to be abnormal. When the retry count reaches n in step B5, error processing is performed. However, if NO in step B5, the flow advances to step B6.

In step B6, in order to detour the defect 64 on the optical card 22, the optical head 56 is moved to a position where the defect 64 is no longer present, and track control can be performed. In this case, although the optical head 56 is moved, the card holder 54 may be moved. Upon completion of step B6, the flow returns to step B3 again.

When the track error signal is determined in step B4 to be normal, the flow advances to step B7 to obtain an amplitude A of the track error signal. Operations in steps B7 to B12 are the same as those in steps A6 to A11 in FIG. 9 of the first embodiment, and a detailed description thereof will be omitted so as to prevent a repetitive description.

Even if an important defect is present on an optical card, the optical head is moved to obtain a normal track error signal by a retry operation, thereby properly performing track control. For example, since a defect on an optical card has a maximum size of about 1 mm, the defect can be properly detoured by shifting the optical head by 2 to 3 mm.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A track control circuit for an optical card recording/reproducing apparatus, comprising:

light beam means for emitting a light beam for optically recording/reproducing information onto a card-like optical recording medium having a plurality of tracks;

focusing means for focusing the light beam emitted from said light beam means onto said card-like optical recording medium;

photosensing means for detecting a beam reflected by a desired track of said card-like optical recording medium;

error signal generating means for generating a track error signal output in accordance with a deviation of the reflected beam detected by said photosensing means;

actuator means having a moving member which is movable across said tracks;

track scanning means for driving said actuator means by transmitting a track scanning signal to said actuator means, in a state wherein said actuator means is stopped relative to said card-like optical recording medium, thereby to perform a track scanning operation wherein the light beam moves across said tracks;

track servo means for holding the light beam on said desired track, by transmitting the track error signal to said actuator means so that said actuator means uses the track error signal in replacement of the track scanning signal;

gain setting means for setting a gain of the track error signal;

determining means for determining that the track error signal is abnormal when an amplitude level of the track error signal differs from a predetermined amplitude level during the track scanning operation, and for determining that the track error signal is normal when the amplitude level of the track error signal is equal to the predetermined amplitude level during the track scanning operation; and control means for outputting to said gain setting means a control signal for controlling the gain set by said gain setting means, only when said light beam means is stopped relative to said card-like optical recording medium and when said determining means determines that the track error signal is normal, and, when said determining means determines that the track error signal is abnormal, moving the light beam across said tracks again after moving said actuator means relative to said card-like optical recording medium.

2. A circuit according to claim 1, wherein said light beam driving means moves said focusing means in horizontal and vertical directions so as to position said focusing means on a given track of the card-like optical recording medium in accordance with the track error signal controlled by said gain setting means and moves said focusing means onto a track different from the given track of the card-like optical recording medium responsive to said determining means determining that the track error signal is less than the predetermined level.

3. A circuit according to claim 1, wherein said light beam means, said focusing means, and said photosensing means constitute an optical system, and wherein said light beam driving means moves said optical system in horizontal and vertical directions so as to position said optical system on a given track of the card-like optical recording medium in accordance with the track error signal controlled by said gain setting means and moves said optical system onto a track different from the given track of the card-like optical recording medium responsive to said determining means determining that the track error signal is less than the predetermined level.

4. A circuit according to claim 1, wherein said control means supplies a control signal to said gain setting means so as to reduce a gain when an amplitude of the track error signal is larger than a predetermined target amplitude level.

5. A circuit according to claim 1, wherein said control means supplies a control signal to said gain setting means so as to increase a gain when an amplitude of the track error signal is smaller than a predetermined target amplitude level.

6. A circuit according to claim 1, wherein said light beam driving means moves a light beam emitted from said light beam means responsive to said determining means determining that a number of cycles for determining that the track error signal is less than the predetermined level falls within a predetermined number.

7. A circuit according to claim 2, wherein said light beam driving means moves said focusing means responsive to said determining means determining that a number of cycles for determining that the track error signal is less than the predetermined level falls within a predetermined number.

8. A circuit according to claim 3, wherein said light beam driving means moves said optical system responsive to said determining means determining that a number of cycles for determining that the track error signal is less than the predetermined level falls within a predetermined number.

9. A circuit according to claim 1, wherein said determining means includes a means for comparing an amplitude of said track error signal with a predetermined reference amplitude level.

10. A circuit according to claim 1, wherein said determining means includes means for comparing a differentiated amplitude of said track error signal with a predetermined reference amplitude level.

11. A circuit according to claim 1, wherein said control means includes a second determining means for determining whether a difference between the amplitude of the track error signal generated by said error signal generating means and that of a second level showing a suitable level of the track error signal is more than a predetermined value, and means for outputting a control signal to control the gain set by said gain setting means when the track error signal generated by said error signal generating means is determined to be more than the predetermined level by said second determining means.

12. A track control method for an optical card recording/reproducing apparatus, comprising:
   a first step of focusing a light beam used for optical recording/reproducing information onto a desired track of a card-like optical recording medium having a plurality of tracks, and detecting the beam reflected by the desired track to output an electrical signal corresponding to the detected reflected beam;
   a second step of generating a track error signal output in accordance with a deviation of the reflected light beam on the basis of the electrical signal;
   a third step of determining whether the track error signal is less than a predetermined level;
   a fourth step of moving the light beam to a track different from the given track of the card-like optical recording medium when the track error signal is determined to be less than the predetermined level;
   a fifth step of performing the third step after the moving of the light beam to a track different from the given track of the card-like optical recording medium by the fourth step; and
   a sixth step, performed after said fifth step, of outputting a control signal to control a gain of amplification of the track error signal when the track error signal is determined to be more than the predetermined level.

13. A method according to claim 12, further comprising executing a further step when the track error signal is determined in said third step to be more than the predetermined level, said further step comprising outputting a control signal to control a gain amplification set by a gain setting means, without executing said fourth and fifth steps.

14. A method according to claim 13, further comprising conducting a predetermined error processing when the track error signal is not determined to be more than the predetermined level after performing said third step a predetermined number of times.

* * * * *